United States Patent [19]
Koyahata et al.

[11] 4,201,390
[45] May 6, 1980

[54] SEMI-AUTOMATIC RECORD PLAYER

[75] Inventors: Hirosi Koyahata, Yokohama; Shunkichi Hioki, Tokyo, both of Japan

[73] Assignee: Kato Electric and Machinery Co. Ltd., Kanagawa, Japan

[21] Appl. No.: 909,010

[22] Filed: May 24, 1978

[30] Foreign Application Priority Data

Jun. 10, 1977 [JP] Japan .............................. 52/76286[U]

[51] Int. Cl.² ............................................. G11B 17/06
[52] U.S. Cl. ................................................. 274/15 R
[58] Field of Search ............................ 274/10 R, 15 R

[56] References Cited
U.S. PATENT DOCUMENTS

| | | | |
|---|---|---|---|
| 3,822,889 | 7/1974 | Nakagawa | 274/10 R |
| 3,847,401 | 11/1974 | Evans | 274/10 R |

*Primary Examiner*—Steven L. Stephan
*Attorney, Agent, or Firm*—George B. Oujevolk

[57] ABSTRACT

A semi-automatic record player with a gear-type automatic tone-arm returning apparatus includes a sliding lever and a returning lever, switching means operated by the sliding and returning levers, tone-arm elevating means, tone arm detecting means and operational means with multiple directions of operation. The operational means is adapted to make the tone-arm detecting means inactive when operating the tone-arm detecting means and the tone arm elevating means to lower the tone arm.

1 Claim, 8 Drawing Figures

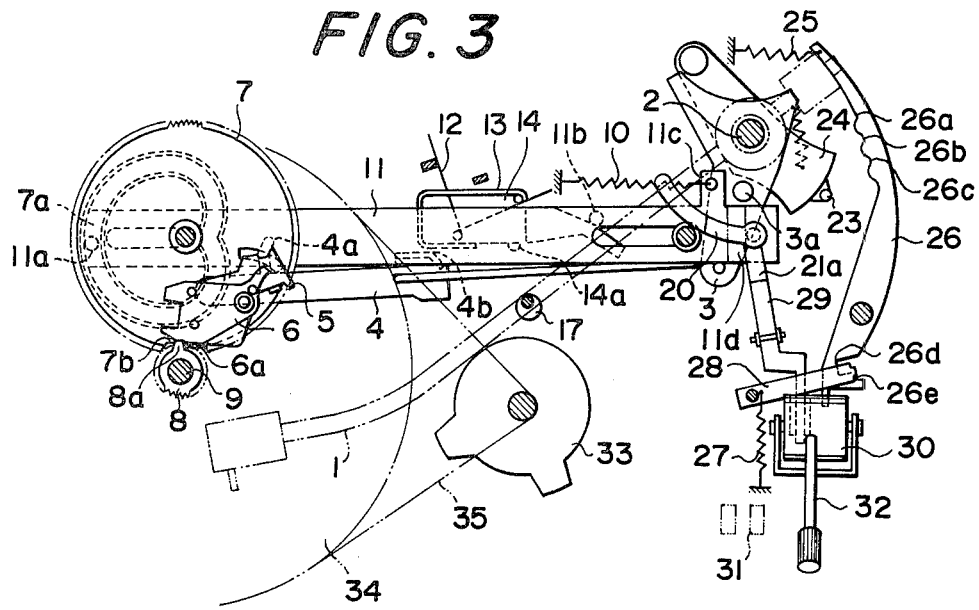
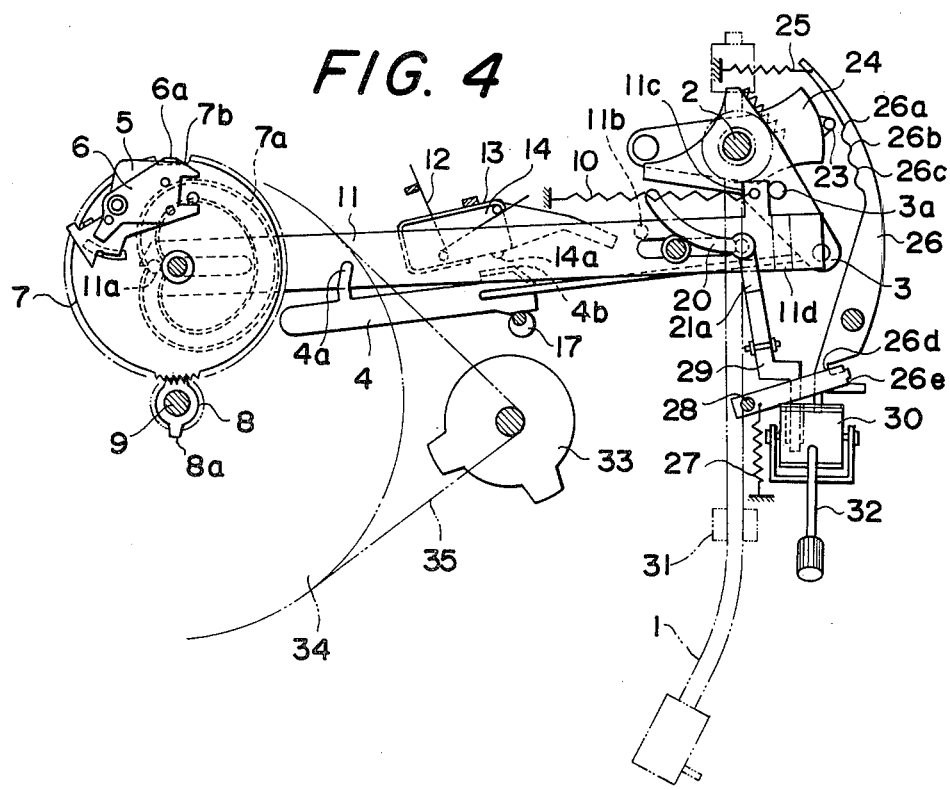

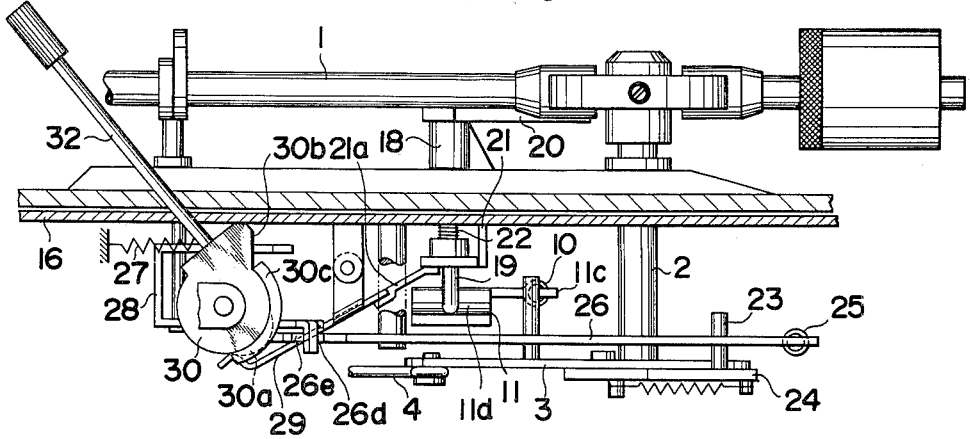
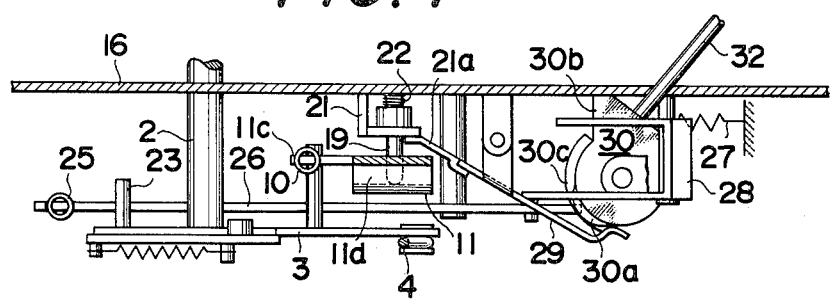
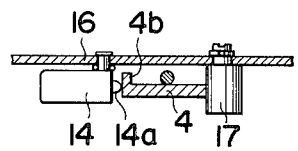
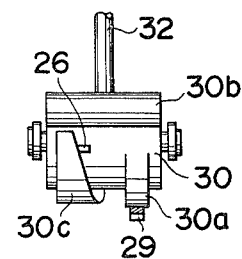

SEMI-AUTOMATIC RECORD PLAYER

This invention relates to an improved semi-automatic record player, and more particularly, to an improved record player for personal use with such apparatus.

While various and sundry forms of automatic record players have been provided in audio systems for commercial use, use of this type apparatus in personal record players is not common. This is because the size and cost of such systems must be expensive.

The problems of personal record players in playing a record, for example operating a starting switch, manually raising and lowering the tone arm according to the record size, and returning the tone arm have been solved with the advent and application of an automatic record player with automatic switching means, automatic tone-arm returning apparatus, automatic lead-in apparatus including tone-arm detecting means and/or tone-arm elevating means, and the like.

It is therefore a principal object of the present invention to provide a new and improved semi-automatic record player.

It is a further object of the present invention to provide an improved semi-automatic record player comprised of the foregoing features in a simple and functional combination.

Other objects and advantages will be apparent from the ensuing description and drawings in which:

FIG. 3 is a top view showing the position immediately after finishing playing;

FIG. 4 is a top view showing the position after returning the tone-arm;

FIG. 5 is a left side view in cross section of the switching means;

FIG. 6 is an enlarged right side view in cross section and with parts broken away showing details of the tone-arm elevating and the cueing means, and the operational member;

FIG. 7 is an isometric left side view of FIG. 6;

FIG. 8 is a front view of the cam member.

Figure 1:
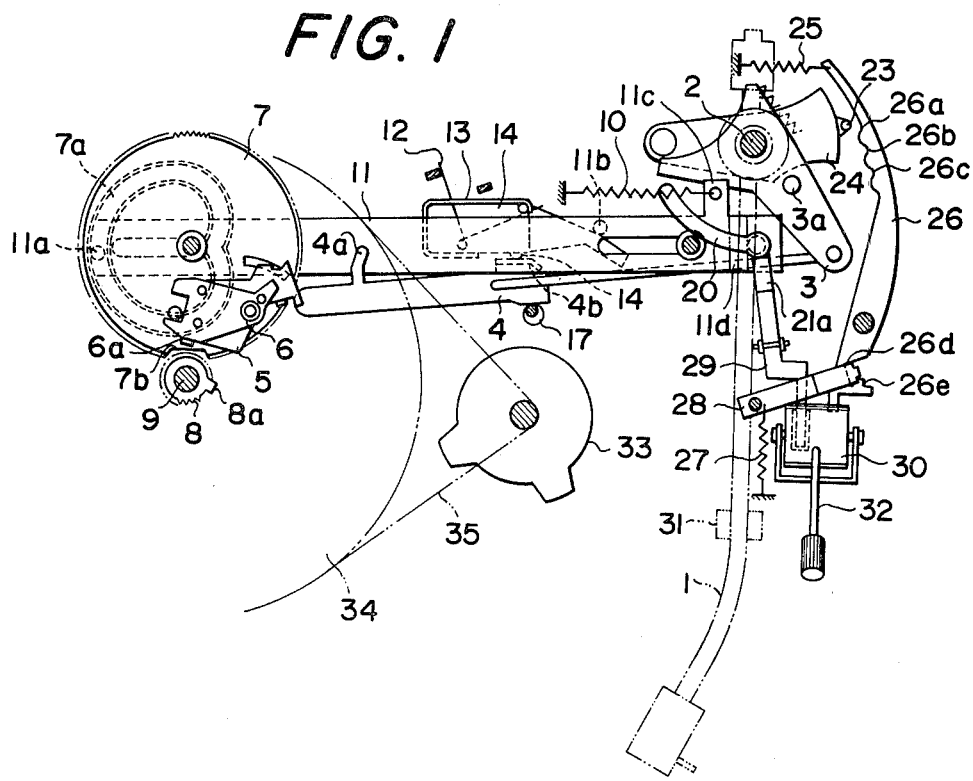
FIG. 1 is a top view of a semi-automatic record player incorporating the apparatus of the present invention in the starting position.

Referring particularly to FIG. 1 of the drawings, the gear-type automatic tone-arm returning apparatus of the present invention there shown comprises a sliding lever 4 longitudinally movable cooperating with the rotation of a tone-arm 1 through an actuating member 3 fixed on an arm shaft 2 of said tone-arm 1, and a driving gear 7 with notch portion 7b 7a on its periphery including two frictional levers 5, 6 which are rotatably supported on its top surface and energized to rotate by a projection 4a of sliding lever 4 and heart-shaped cam track 7a formed on its bottom surface, and a main driving gear 8 with a stopping protrusion 8a on its periphery which keeps idling within notch portion 7b of driving gear 7 when a record thereon is played, and a returning lever 11 with a pin 11a on its left side end inserted in cam track 7a of gear 7 longitudinally movable and leftwardly pulled by a spring 10.

Switching means includes an actuating portion 4b on the side of the intermediate portion of said sliding lever 4, and an actuating pin 11b extending downwardly from the middle portion of said returning lever 11, and a starting switch 14 in a suitable housing 13 which is pulled by a spring 12 to potentially move away from said actuating portion 4b and pivotally supported within the track delineated by said actuating portion 4b and actuating pin 11b, and a stopping member 17 fixed on a plate 16 located opposite contact position of a switching portion 14a of said starting switch 14 and an actuating portion 4b of lever 4.

Stopping member 17 described above may be omitted if sliding lever 4 is stiff enough not to buckle, but is necessary if sliding lever 4 is yielding or actuating portion 4b is an independent member pivotally supported on sliding lever 4. Spring 12 may also be unnecessary because actuating portion 4b of sliding lever 4 returning to its original position is slightly tapped by switching portion 14a when tone-arm 1 is automatically returned, but is preferably employed to maintain accuracy and reliability. Actuating portion 4b may be provided on returning lever 11.

Referring now particularly to FIGS. 1 and 6, the tone-arm elevating means is comprised of an arm lifter 18, and an elevating arm 19 with its top portion inserted in the arm lifter 18 and its bottom end resting on the returning lever 11, and an arm supporter 20 provided on the top of the elevating arm 19, and a spring 22 disposed between a rotation preventing member 21 fixed on the elevating arm 19 and the arm lifter 18, and a lifting member 29 of crank-shape which is rotatably supported on said plate 16 with its end resting on the bottom surface of the rotation preventing member 21.

Tone-arm detecting means includes a detecting member 24 cooperatedly turnable with the arm shaft 2 of tone-arm 1, and a detecting pin 23 fixed on an end of said detecting member 24, and a bow-shaped selector plate 26 rotatably supported and pulled toward said detecting pin 23 by a spring 25, and a stopping member 28 energized to rotate clockwise by a spring 27 stopping said selector plate 26. Selector plate 26 has a plurality of concave portions 26a, 26b, 26c at one end to partly stop the rotation of the tone-arm 1 according to the record size (30 cm, 25 cm, 17 cm, etc.) and two step portions 26d, 26e on the other end engaging said stopping member 28.

Operational means comprise a cam member 30 rotatably supported and including three concave portions 30a, 30b, 30c on its periphery, and an operational lever 32 fixed on said cam member 30 extending upwardly beyond the plate 16. Convex portions 30a and 30b are bow-shaped and extending outwardly on its periphery of said cam meber 30 with the lifting member 29 and stopping member 28 for engaging each surface. Referring now particularly to FIGS. 1, 6, 7, and 8, notch 30c is formed to longitudinally widen and engage the selector plate 26 on its slope-like surface.

Again, as illustrated in FIG. 1, when tone-arm 1 remains on an arm rest 31 or before starting to play a record thereon, driving gear 7 and main driving gear 8 of the gear-type automatic tone-arm returning apparatus are not in engaged relation. And returning lever 11 is located at its left side end of the working area and sliding lever 4 is at its right side end. Starting switch 14 is OFF at this time being pushed clockwise by actuating pin 11b provided on the returning lever 11, the switching portion 14a is engaged with actuating portion 4b provided on the sliding lever 4. Operational lever 32 of the operational means is inclined towards the operator side, and lifting member 29 of the tone-arm elevating means is not in actuating relation with elevating arm 19, and selector plate 26 of the tone-arm detecting means remains unengaged with detecting pin 23.

When operational lever 32 is operated to the vertical position to start playing the record, cam member 32 fixed to the operational lever rotates and convex portion 30a presses down the end of lifting member 29 causing the other end of said lifting member 29 to rise and lift elevating arm 19 and tone-arm 1. Selector plate 26 with its one end resting on the slope-like surface of convex portion 30c of said cam member 30 then rotates slightly counter-clockwise and the end of said selector plate 26 having concave portions 26a, 26b, 26c comes into contact with detecting pin 23.

Figure 2:
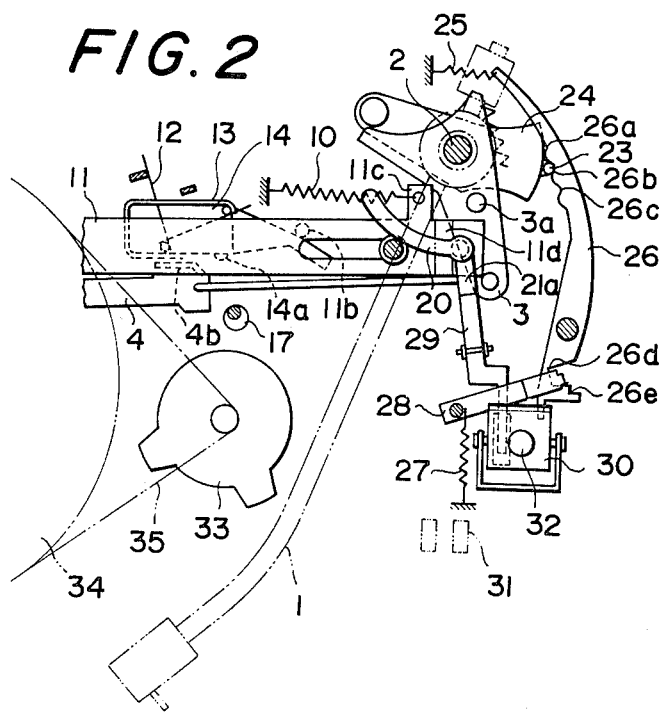
FIG. 2 is a portion of the top view of the apparatus shown in FIGS. 1, 3 and 4.

As tone-arm 1 is manually rotated toward the record as shown in FIG. 2, the sliding lever 4 which is pivotally connected and the actuating member 3 simultaneously move leftwards and actuating portion 4b provided on said sliding lever 4 moves away from the switching portion 14a of starting switch 14 placing said starting switch to the on position. Driving motor 33 then begins to rotate turn-table 34 via belt 35. In cooperation with the rotation of tone-arm 1 detecting pin 23 engages with concave portions 26a, 26b, 26c of the controlling member 26 one after another to stop the tone-arm rotation above the outer silent leading track of a record there played. It must be apparent that the engagement between said detecting pin 23 and selector lever 26 is readily fled when the tone-arm 1 is operated to turn clockwise or counter-clockwise. When operational lever 32 is operated to turn toward operator side, elevating means 29 is energized to descend and lower tone-arm 1 and the pick-up needle onto the outer silent leading track of a record thereon. As aforesaid, tone-arm 1 can be lowered only through the operation of operational lever 32 and this prevents inadvertent drop of tone-arm 1 onto the record from damaging and breaking the record and/or the pick-up needle.

With the operation of operational lever 32 toward operator side, cam member 30 rotates and convex portion 30c provided on said cam member 30 engages with selector lever 26 to turn clockwise and move away from detecting pin 23. This prevents restraint of the movement of tone arm 1 working on the record while stopping member 28 engages the step portion 26e of selector plate 26, which is canceled only by the operation of operational lever 32 back to the vertical position.

In the case of starting to play in one of the middle sound tracks of a record, the engagement between detecting pin 23 and selector plate 26 is easily broken by concave portions 26a, 26b and 26c through the operation of rotating tone-arm 1, and lowering tone-arm 1 onto the sound track can also be operated by turning operational lever 32 towards the operator side which prevents damaging and breaking the record and/or the pick-up needle. In the case of stopping the playing before finishing the operation of the returning tone-arm 1 to its original position energizes sliding lever 4 to move back to the left and actuating portion 4b on sliding lever 4 engages between starting switch 14 and stopping member 17, which places switching portion 14a in the OFF position and driving motor 33 then stops.

As tone-arm 1 is forced to turn by the final silent record track after playing is finished as shown in FIG. 3, a projection 4a provided on sliding lever 4 pushes the end of frictional lever 5 to turn counter-clockwise with frictional lever 6, and projection 6a provided on frictional lever 6 engages a stopping protrusion 8a on the main driving gear 8 and energizes to slightly rotate driving gear 7 counter-clockwise which causes the engagement between said driving gear 7 and said main driving gear 8. Driving gear 7 is then rotated, and returning lever 11 with pin 11a inserted in cam track 7a begins to move to the right and raises a bent portion 11d, elevating arm 19, and tone-arm 1 with a protrusion 11c then pushes the pin 3a on actuating member 3 to return tone-arm 1 as shown in FIG. 4 and back to the original position as shown in FIG. 1. The aforesaid action takes place during one rotation of driving gear 7 and the periphery of main driving gear 8 pushes the friction levers 5 and 6 into notch portion 7b to prevent the continuous function of the returning apparatus.

When tone-arm 1 is returned and is being pushed by protrusion 11c on returning lever 11, returning lever 11 moves to the right cooperating with sliding lever 4 and pivots starting switch 14 and housing 13 with a spring 12 which prevents the engagement between the actuating pin 11b and housing 13 and consequently between actuating portion 4a and switching portion 14a, and enables driving motor 33 to continuously drive the apparatus.

As returning lever 11 reaches the original position, elevating arm 19 disengages bent portion 11d and descends to lower tone-arm 1 into arm rest 31.

When the record playing is finished, operating lever 32 is in the operator side position keeping portion 26e of the selector plate and stopping member 28 in the engaged position which prevents actuation of selector plate 26 on detecting pin 23 so that the tone-arm detecting means remains inactive when operational lever 32 is moved to the vertical position to start playing. To avoid the problem, operational lever 32 must be turned once towards the rear side to rotate cam member 30 and make protrusion 30b turn stopping member 28 counter-clockwise and change the engaging portion between stopping member 28 and selector plate 26 from step portion 26e to stop portion 26d. This enables the tone-arm detecting means to operate again.

The tone-arm 1 can also be manually handled leaving operational lever 32 on the operator side position. As operational lever 32 is in the vertical position an inadvertent operation of lowering the tone-arm 1 onto the arm rest 31 may not cause damage and break or buckle elevating member 29 if the surface of the elevating member 29 which contacts rotation preventing member 21 is provided with a flexible member such as a plate spring or the like.

From the foregoing description, it can be seen that the present inventive concept makes it possible to operate a starting switch and a tone-arm mechanically with an operational lever 32 so that the operation to turn the switch ON and play a record is quite simple and the danger of damaging the record or pick-up needle are avoided. Returning the tone-arm 1 and switching to the OFF position are done automatically after the playing is finished.

The tone-arm elevating means are tone-arm detecting means are easily operated simultaneously or independently with a single operational lever 32 which makes the entire apparatus simple and low in cost.

While the invention has been described with reference to the structure disclosed, it is not confined to the details set forth, but is intended to cover such modifications or changes as may come within the scope of the following claims.

What is claimed is:

1. In a semiautomatic record player having a turn-table (34) driven by a motor (33) wherein a record on said turn-table (34) is engaged by the outer end of an elongated tone-arm (1), the inner end of said tone arm (1) being fixed on a tone-arm shaft (2) pivotally mounted on a plate (16) so that said tone-arm (1) outer end can swing horizontally to and away from engagement with a record on said turn-table (34), said record player also having an arm rest where said tone arm outer end normally rests when not playing a record, in combination:

(a) a tone-arm returning apparatus including an actuating member (3) attached to said tone-arm shaft (2), an extended sliding lever (4), one end of which is pivotally mounted on said actuating member (3), said sliding lever (4) moving reciprocally in relation to the horizontal swing motion of said tone-arm (1), a turn-table spindle (9) coupled to said turn-table (34), a main driving gear (8) fixed to said turn-table spindle (9), a second driving gear (7) adjacent said main driving gear (8), said second driving gear (7) having lever means (5,6) pivotally mounted thereon, said lever means being adjacent said sliding lever's other end, said second driving gear (7) and said lever means (5,6) being so disposed that said second driving gear (7) will engage said main driving gear (8) when said lever means (5,6) are engaged by said sliding lever's other end when said sliding lever (4) is moved in one direction, a cam track (7a) on said second driving gear (7), and a return lever (11) one end of which is engaged with said cam track (7a) and the other end of which has a bent portion (11d);

(b) a tone-arm elevating means coupled to said tone-arm (1) located towards said tone-arm inner end and disposed for lifting said tone-arm, including an elevating arm (19) disposed for raising said tone-arm and lowering said tone-arm with respect to said turn-table, and a lifting member (29) having one end which abuts against said elevating arm (19), said lifting member (29) being disposed for moving said elevating arm (19) in the direction to raise and lower said-tone arm with respect to said turn-table, said returning lever (11) being so adapted and designed as to be reciprocally moved by the turn of said second driving gear (7) and to lift said tone-arm (1) by means of said elevating arm (19) which comes into contact with said bent portion (11d), and to push said actuating member (3) such that said tone-arm (1) is lowered with respect to said turn-table and returned to its normal position on the arm rest (31);

(c) switch operating means comprising an actuating pin (11b) disposed on the returning lever (11), an actuating portion (4b) which protrudes on an intermediate portion of the sliding lever (4), a starting switch (14) which is pivotally mounted so as to be swingable between said actuating pin (11b) and said actuating portion (4b), and a stopping member (17) which is located at one side of said actuating portion (4b), so that said starting switch (14) can be turned to the OFF position only when said actuating portion (4b), said actuating pin (11) and said stopping member (17) occupy predetermined positions;

(d) a tone-arm detecting means for click-stopping said tone-arm (1) on a leading track of a record of any size, said tone-arm detecting means including a detecting pin (23) which turns together with said tone-arm (1), and a selector lever (26) which is pivotally mounted on said plate (16) while being urged to rotate, said selector lever (26) having concave portions (26a, 26b, 26c) disposed for slightly click-stopping said detecting pin (23) but capable of over-riding said stop when said detecting pin (23) firmly presses against said concave portions (26a, 26b, 26c); and, (e) an operational means composed of a cam member (30) rotatably supported by said plate (16) and having two protrusions (30a, 30c) which come into contact with the end portion of said lifting member (29) and said selector lever (26), and an operational lever (36) mounted on said cam (24), said operational means being so constructed that said detecting pin (23) and said selector lever (26) come into contact with each other only when said operational lever (36) raises said tone-arm (1) through said lifting member.

* * * * *